June 24, 1969

J. NYDEGGER 3,451,869

METHOD OF ULTRASONICALLY WELDING PLASTIC INDEX
CHARACTERS TO A PLASTIC CLOCK DIAL PLATE

Filed April 5, 1965

United States Patent Office 3,451,869
Patented June 24, 1969

3,451,869
METHOD OF ULTRASONICALLY WELDING PLASTIC INDEX CHARACTERS TO A PLASTIC CLOCK DIAL PLATE
Jean Nydegger, Macolin, Bern, Switzerland
Filed Apr. 5, 1965, Ser. No. 445,717
Claims priority, application Switzerland, Apr. 6, 1964, 4,312/64
Int. Cl. B32b 27/08
U.S. Cl. 156—73
2 Claims

ABSTRACT OF THE DISCLOSURE

A method for manufacturing a clock dial in which index characters are welded ultrasonically on a dial plate, the index characters and dial plate being respectively constituted of synthetic thermoplastic resin material of which the hardness of the index characters is substantially greater than that of the dial plate.

---

The present invention relates to a method for manufacturing a clock dial, in which the dial plate and the indexes or time-indicating characters are made of synthetic thermoplastic resin material, and the indexes are welded to the dial plate by means of ultrasonic frequencies.

The manufacture of dials made of synthetic thermoplastic resin material with indexes welded thereon by ultrasonic frequencies, gives rise to difficulties as regards the materials which are to be used. As a matter of fact, the dial plates have to be made of a material not too brittle especially due to the fact that the feet of the dials are generally made of one piece with the plates. On the contrary, the use of a nonbrittle material is not suited for the molding of the indexes. As a matter of fact, difficulties arise with such material when the indexes have to be separated from their injection plugs. Moreover, a material too flexible for the manufacture of the indexes can produce difficulties when the indexes are welded by means of ultrasonic frequencies.

In the case of welding by means of ultrasonic frequencies applied perpendicularly to the plane of the dial plates, it is preferred to weld several indexes on the same plate simultaneously, and it is advantageous to provide the base of the indexes with projections engaging into the material of the dial plate. In this case, it is necessary that the crushing strength of the synthetic thermoplastic resin material be higher for the indexes than for the dial plate, so that te said projections of the indexes engage into the plate.

An object of the invention is to provide a method of manufacture satisfying the above mentioned conditions.

The method according to the invention is characterized by using, for the dial plate, a synthetic thermoplastic resin material the hardness of which is lower than the hardness of the synthetic thermoplastic resin material of the indexes.

Figure 1:
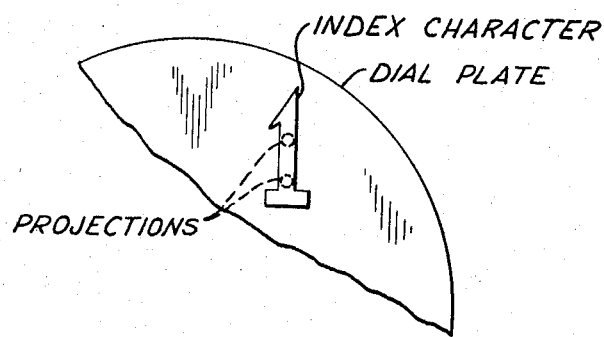
Figure 2:
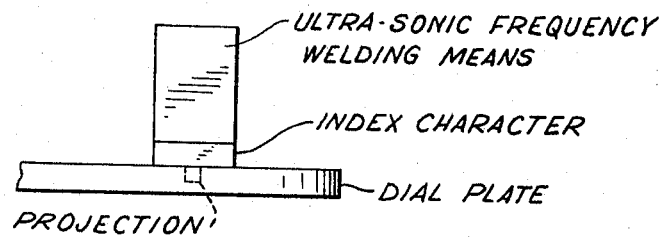

The invention is illustrated schematically in the attached drawing, wherein:
FIG. 1 is an elevation view of a portion of a clock dial, and
FIG. 2 is a side view of the dial of FIG. 1 diagrammatically showing the welding of the index to the dial plate.

It has been ascertained that, by using, for the dial plates, a synthetic thermoplastic resin material of less hardness than the material used for the indexes, that is to say less crushing strength, various advantages are obtained, not only with respect to the manufacture of the dial plates provided with feet and of the indexes, but also with respect to the welding of the indexes by means of ultrasonic frequencies. Moreover, the use of such material is of advantage in the engagement of projections on the indexes in the dial plate.

The material of the plates has a maximum hardness of a Rockwell value of R125, while the material of the indexes has a hardness with at least a Rockwell value of M65. For instance, resins such as acetobutyrates of cellulose will be used for the manufacture of the plates and resins of polystyrene for the indexes.

By selecting the respective material of the plates and of the indexes as indicated hereabove, the plates will be sufficiently strong while being not too brittle, which is favorable with respect to their feet, made of one piece with the plates, while the indexes will be harder, more brittle and have a greater crushing-strength, which is favorable both for separating them from their injection plugs as well as for welding them to the plates.

What is claimed is:
1. A method of manufacturing a clock dial comprising welding, with ultrasonic frequency, index characters on a dial plate, said index characters and dial plate being respectively constituted of synthetic thermoplastic resin material of which the hardness of the index characters is substantially greater than that of the dial plate, the hardness of the plastic material of the index characters being at least a value of Rockwell M65 while the hardness of the plastic material of the dial plate is less than a value of Rockwell R125.
2. A method as claimed in claim 1 wherein said thermoplastic resin material of the dial plate is cellulose acetobutyrate and that of the index characters is polystyrene.

References Cited
UNITED STATES PATENTS

| | | | |
|---|---|---|---|
| 3,234,641 | 2/1966 | Schneider et al. | 58—127 XR |
| 3,197,846 | 8/1965 | Vogt | 58—127 XR |
| 3,047,942 | 8/1962 | Schneider et al. | 156—73 XR |

PHILIP DIER, *Primary Examiner.*

U.S. Cl. X.R.
29—470; 58—127; 156—306, 380; 161—249